United States Patent

Asou et al.

[11] Patent Number: 5,609,343
[45] Date of Patent: Mar. 11, 1997

[54] SEALING RINGS FOR SPOOL VALVES

[75] Inventors: Yoshio Asou; Takumi Matsumoto; Shinichi Yoshimura, all of Yawara-mura, Japan

[73] Assignee: SMC Corporation, Tokyo, Japan

[21] Appl. No.: 323,128

[22] Filed: Oct. 14, 1994

[51] Int. Cl.⁶ .................................................. F16J 15/32
[52] U.S. Cl. .................. 277/152; 277/167.3; 277/206 H; 277/215; 137/625.66; 137/625.69
[58] Field of Search .................. 277/152, 167.3, 277/177, 214, 215, 206 A, 211; 137/249, 484, 625.66, 625.69; 251/214

[56] References Cited

U.S. PATENT DOCUMENTS

| | | | |
|---|---|---|---|
| 3,635,249 | 1/1972 | Kirkman | 277/125 |
| 3,968,971 | 7/1976 | Mariaulle | 277/177 |
| 4,240,467 | 12/1980 | Blatt et al. | 277/177 |
| 5,088,745 | 2/1992 | Peppiatt et al. | 277/177 |
| 5,127,661 | 7/1992 | Franson et al. | 277/152 |
| 5,171,025 | 12/1992 | Stoll et al. | 277/152 |
| 5,261,677 | 11/1993 | Gotoh et al. | 277/206 A |
| 5,277,327 | 1/1994 | Nakano et al. | 277/206 A |
| 5,337,787 | 8/1994 | Fiondella | 137/625.69 |

FOREIGN PATENT DOCUMENTS

| | | | |
|---|---|---|---|
| 584480 | 3/1994 | European Pat. Off. | 277/152 |
| 97806 | 6/1978 | Germany | 277/206 A |
| 3442463 | 5/1986 | Germany | 277/206 A |
| 419751 | 3/1967 | Switzerland | 277/177 |
| 608030 | 5/1978 | U.S.S.R. | 277/152 |
| 811023 | 3/1981 | U.S.S.R. | 277/152 |

*Primary Examiner*—Scott W. Cummings
*Attorney, Agent, or Firm*—Oblon, Spivak, McClelland, Maier & Neustadt, P.C.

[57] ABSTRACT

Provision of constrictions imparts to a sealing ring for spool valves both needing flexibility and sufficient strength to remain undetached from the spool in the spool valves. The constrictions to impart flexibility are provided on the outside of the center of the band width of the sealing ring. The ring is of a greater axial thickness on a radially inner side thereof than at the constrictions so as to be firmly fitted in a groove of the spool.

4 Claims, 5 Drawing Sheets

SEALING RINGS FOR SPOOL VALVES

FIELD OF THE INVENTION

This invention relates to sealing rings for spool valves that are mounted on the spools of spool valves.

DESCRIPTION OF THE PRIOR ART

Generally, a spool valve has slidable spools in its valve bore in which multiple ports open, with the sliding motion of the spools switching the flow of the hydraulic fluid between the individual ports. Each spool has annular seals that are adapted to come in contact with valve seats provided in the valve bore and fitted in grooves cut around its periphery.

FIG. 8 shows a cross-sectional view of a common sealing ring 2 that is used with spool valves of the type described above. This sealing ring is shaped like a cocoon with both sides thereof constricted in the middle. These constrictions impart flexibility to the sealing ring 2, facilitates its deformation on moving, and allows it to slide smoothly.

Because of the constrictions in the middle, however, the conventional sealing ring 2 is more flexible than is really desired for securing a tight fit on the spool. When the spool 1 moves, consequently, the resistance to sliding built up between the sealing ring 2 and the wall of the valve bore and the hydraulic pressure acting on the sealing ring 2 deform and pull the sealing ring 2 outward. The sealing ring 2 then floats and comes off the groove 4 in which it has been fit.

This problem may be overcome by eliminating the constriction in the middle. Elimination of these constrictions, however, will make the sealing ring rigid and bring about an increase in the resistance to sliding that destroys the smoothness of the motion of the spool 1 and increases the wear thereof.

SUMMARY OF THE INVENTION

The object of this invention is to provide constricted spool rings for spool valves that have both necessary flexibility and sufficient strength to provide the desired tight fit.

To achieve this object, a spool ring adapted to be fitted in a groove cut around the periphery of a spool of a spool valve according to this invention has constrictions to increase the flexibility of the ring on the outer side rather than the center of the band width of the ring.

A preferred embodiment of this invention described later has a thickness gradually tapering outward from the inside of the ring.

Sealing rings according to this invention must preferably have a band width that is at least 1.5 times the thickness of the inner circumference thereof.

To prevent a sealing ring from sticking to the top and bottom walls of the groove, radially extending vent grooves may be provided on the top and bottom sides thereof.

Because of the outwardly offset constrictions, the sealing rings for spool valves according to this invention have a sufficient rigidity (strength) on their inner side while retaining the required flexibility. The sealing rings of this design firmly fit in the grooves and do not float and come off therefrom under the influence of hydraulic fluid or other forces that work when the spool moves.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT INVENTION

Figure 1:
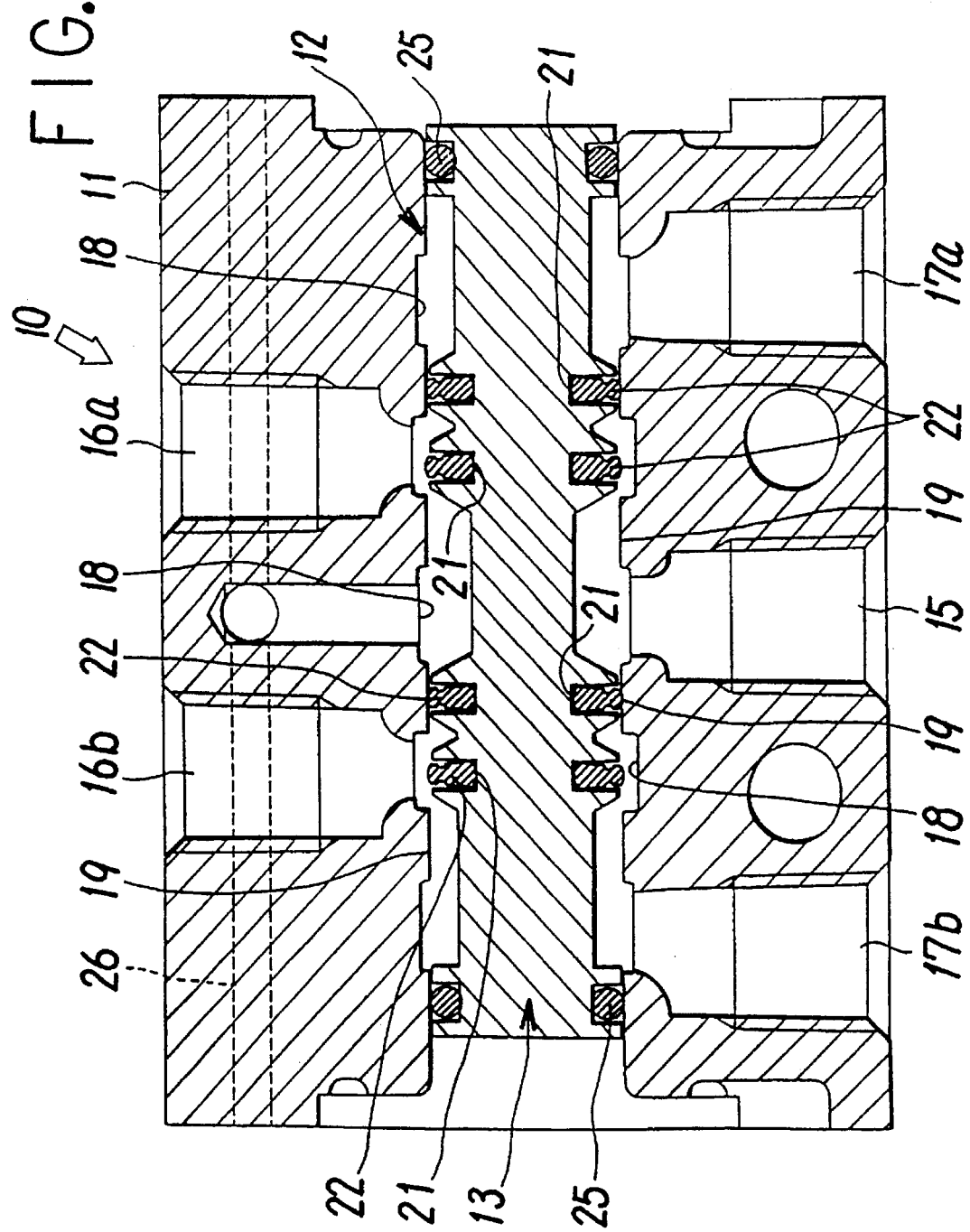
FIG. 1 is a cross-sectional view of a spool valve fitted with sealing rings that are a first embodiment of this invention.

FIGS. 1 to 4 show an example of a spool valve in which the sealing rings of this invention are used. A spool valve 10 comprises a valve body 11 and a spool 13 slidably fitted in a valve bore 12 in the valve body 11. A suitable means, not shown, that uses electromagnetic, mechanical, hydraulic or other force reciprocates the spool 13 in the valve bore.

The valve body 11 has a compressed-air inlet port 15, outlet ports 16a and 16b and exhaust ports 17a and 17b. On the inner surface of the valve bore 12 are formed multiple circular grooves 18 into which the aforementioned ports open and valve seats 19.

Multiple grooves 21 each having a substantially equal width are cut around the periphery of the spool 13. Into each groove 21 is fitted a sealing ring 22 that comes into sliding contact with the valve seats 19, with the outer end thereof slightly projecting from the edge of the groove. As the spool 13 slides, each sealing ring 22 moves from a position opposite a circular groove 18 to another position where it comes into contact with a valve seat 19, thereby switching the flow of hydraulic fluid between the individual ports.

In FIG. 1, reference numerals 25 and 26 respectively designate a sliding seal fitted in a groove cut at each axial end of the spool 13 and a pilot passage.

Figure 2:
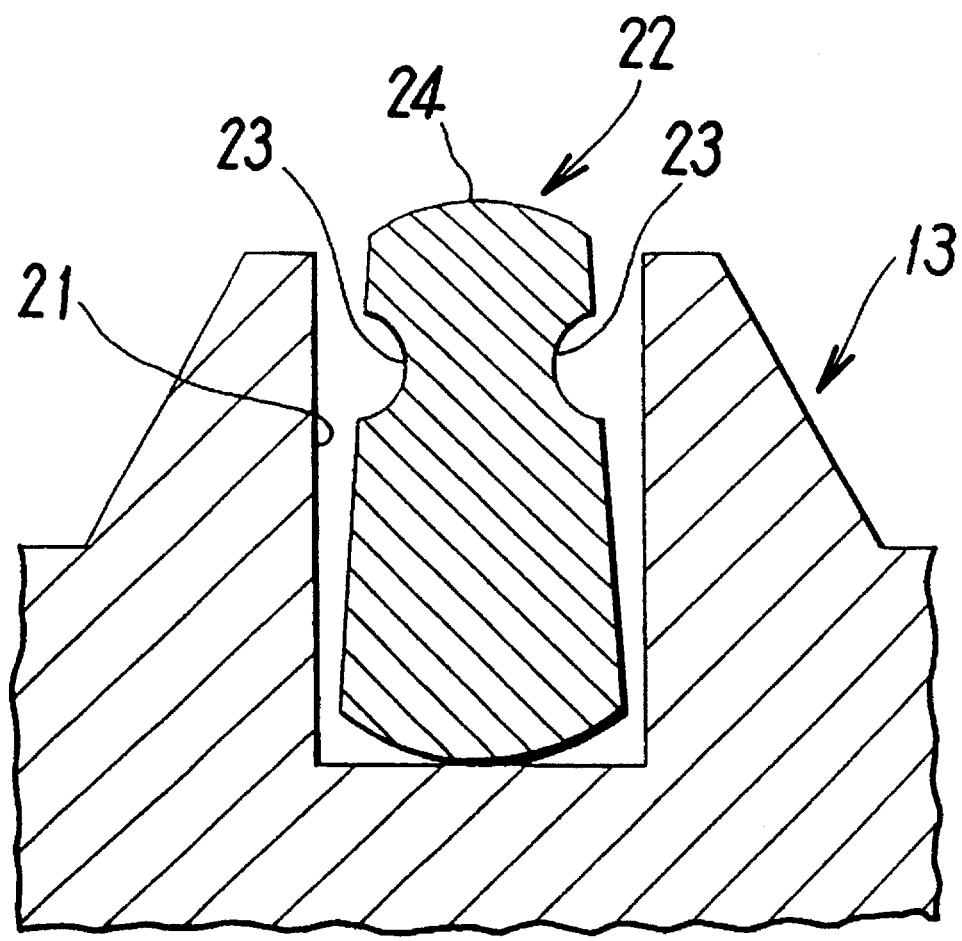
FIG. 2 is a cross-sectional view enlarging the principal parts of FIG. 1.
Figure 3:
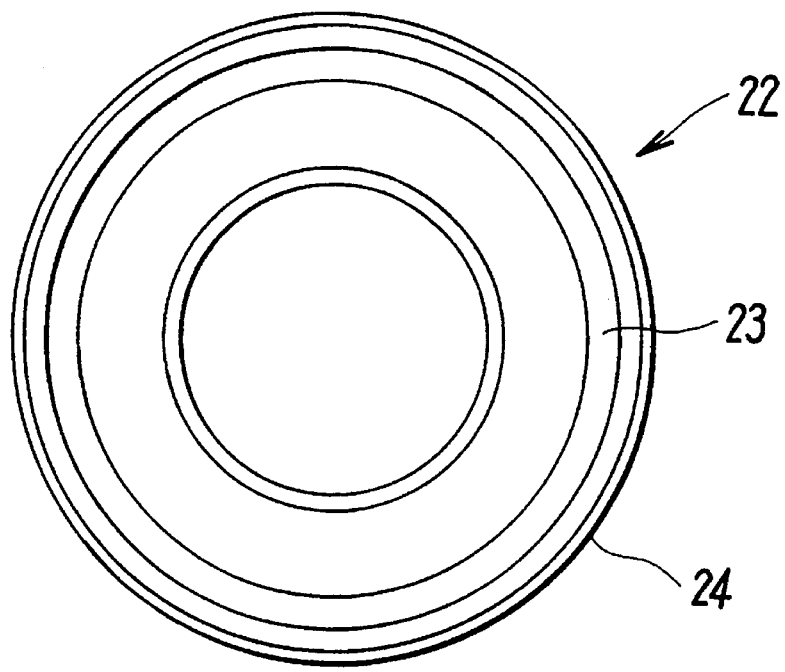
FIG. 3 is a side elevational view of a sealing ring constituting the first embodiment.
Figure 4:
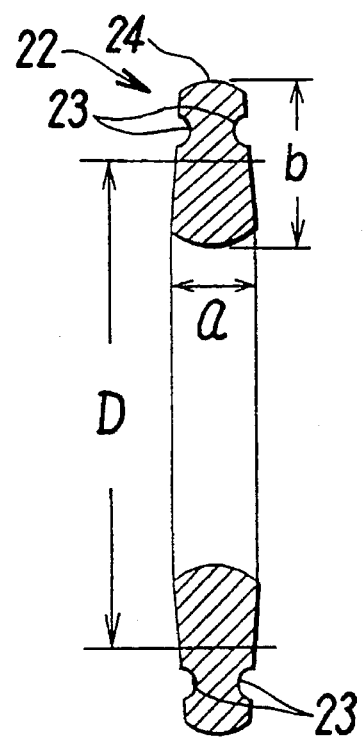
FIG. 4 is a vertical cross-sectional view of the sealing ring shown in FIG. 3.

As shown in detail in FIGS. 2 to 4, the sealing ring 22 has a band width b that is not less than 1.5 times the axial thickness a of the inner part thereof. The bandwidth b comprises the difference between the inner and outer diameter of the ring 22. The thickness a gradually decreases outward from the inner part. The sealing ring 22 also has annular depressions 23 on both sides thereof. The annular depressions 23 are located radially of the center of the band width b or provided on a circle with a diameter D that passes the center of the band width b. These depressions form the constrictions that impart flexibility to the sealing ring 22. The depressions 23 are provided in such a position that they are inside the groove 21 in the spool 13 when the sealing ring 22 is fitted therein.

Thus, the sealing ring 22 has its constrictions radially outside of the center of the band width b, not inside. This adds a secondary contour feature to the sealing ring 22 that its thickness is greater on the inner side than on the outer side. Because of this shape, the inner part of the sealing ring 22 has a considerably greater rigidity (strength) than that of the conventional sealing rings. As a consequence, the sealing ring 22 firmly fits in the groove 21 cut in the spool 13, and, therefore, does not float and come off therefrom under the influence of hydraulic pressure or other forces that might work when the spool 13 moves.

On the other hand, provision of the depressions 23 makes the outer part of the sealing ring 22 more flexible than that of conventional ones. When the spool moves, therefore, the outer rim 24 of the sealing ring readily deforms as needed without undergoing excessive compression or deformation. This flexibility reduces the resistance to sliding of the sealing ring 22, causes little friction buildup, and lengthens the life of the valve.

In the spool valve shown in FIG. 1, the input port 15 communicates with the output port 16a and the output port 16b with the exhaust port 17b. When the spool 13 is moved toward the left in the figure by a suitable operating mechanism, the input port 15 communicates with the output port 16b and the output port 16a with the exhaust port 17a. When the spool thus moves, a resistance to slide works on the outer rim 24 of the sealing ring 22. However, the depressions 23 make the outer part of the sealing ring 22 so flexible that the outer rim 24 readily deforms to reduce the resistance to slide and ensure a smooth slide of the spool 13.

Figure 5:
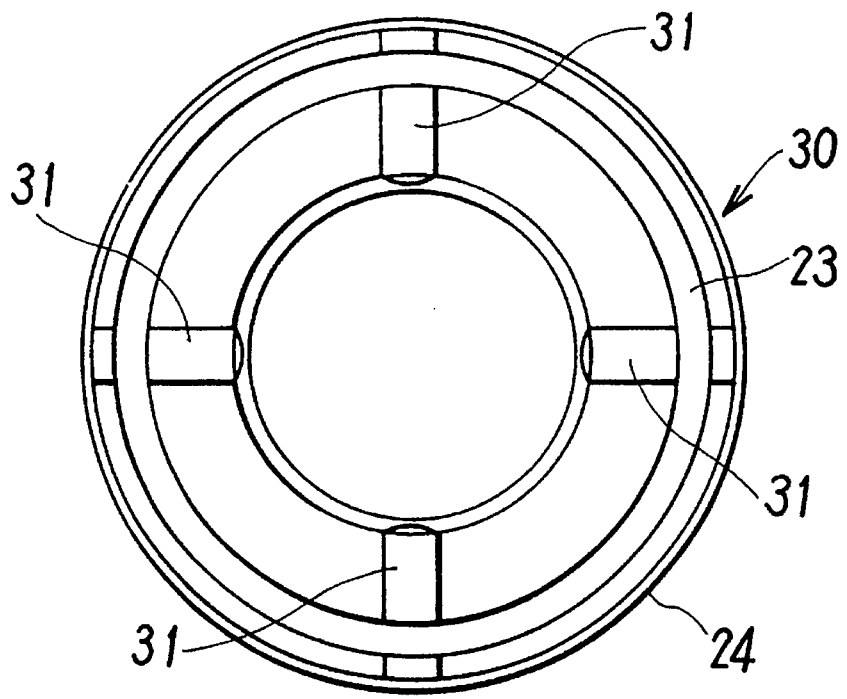
FIG. 5 is a side elevational view of a sealing ring constituting a second embodiment of this invention.
Figure 6:
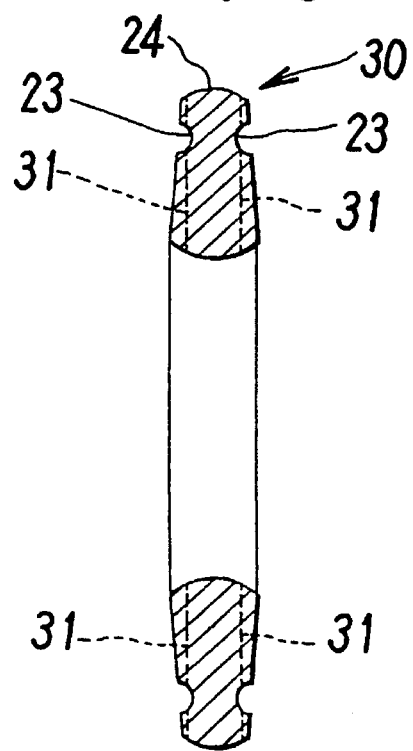
FIG. 6 is a vertical cross-sectional view of the sealing ring shown in FIG. 5.

FIGS. 5 and 6 show another embodiment of this invention. This sealing ring 30 is substantially analogous to the first embodiment 22 except as for the following points.

The difference lies in radially extending vent grooves 31 that are provided on both sides of the sealing ring 30 to prevent the sealing ring 30 from sticking to the side walls of the groove 21.

Other parts of the sealing ring 30 similar to those of the sealing ring 22 are designated by like reference numerals without being elaborated on.

The thickness of the sealing ring, which is made greater on the inner side than on the outer side in the embodiments described above, may be uniform throughout.

Figure 7:
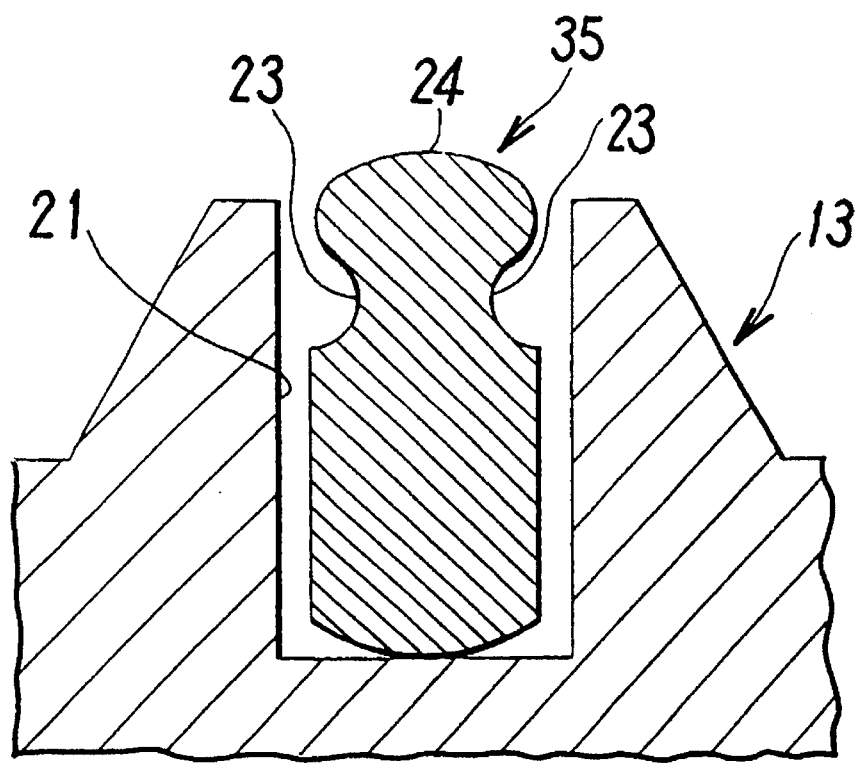
FIG. 7 is a cross-sectional view enlarging the principal parts of a sealing ring constituting a third embodiment of this invention and a spool fitted therewith.
Figure 8:
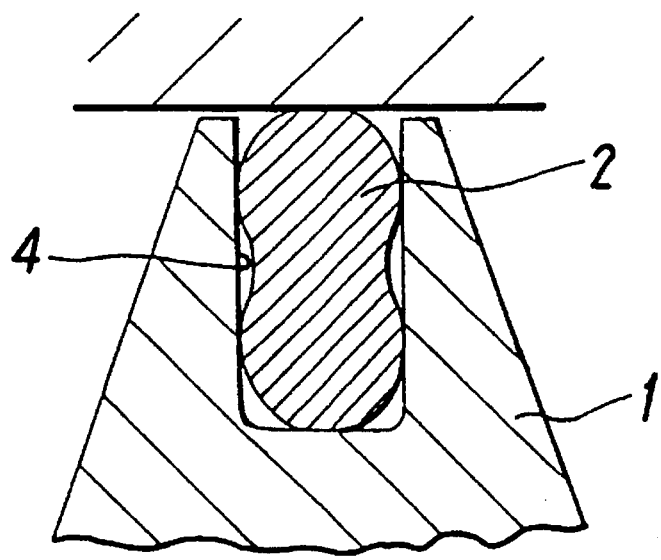
FIG. 8 is a cross-sectional view of a conventional sealing ring fitted on a spool.

FIG. 7 shows still another sealing ring 35 according to this invention. The sealing ring 35 is similar to the first sealing ring 22 except as for the following points. The difference lies in the thickness of the sealing ring 35 that is substantially uniform on both inner and outer parts thereof, with the outer edge of the constricted depressions 23 forming a smooth curve that leads to the outer rim 24. Here again, similar parts are designated by similar reference numerals without being elaborated on.

Though not shown, this sealing ring 35 may also have radially extending vent grooves similar to those on the second sealing ring 30 shown in FIGS. 5 and 6.

As have been described, the sealing rings for spool valves according to this invention have greater rigidity (strength) on their inner part while maintaining the needed flexibility because of the constrictions provided on the outer side than on convention sealing rings. On account of this improved design, the sealing rings of this invention firmly fit in the grooves cut in the spool, and, therefore, do not float and come off therefrom under the influence of hydraulic pressure or other forces that might work when the spool moves.

What is claimed is:

1. A sealing assembly, which comprises:

a spool having a groove cut around a periphery of the spool; and a sealing ring having constrictions imparting flexibility to the ring wherein said constrictions are located radially outside a center of a band width of the ring wherein the band width comprises the difference between the inner and outer diameters of the ring and wherein the ring is of a greater axial thickness on a radially inner side thereof than at said constrictions so as to be firmly fitted in the groove of the spool.

2. A sealing assembly according to claim 1, in which the sealing ring has an axial thickness which gradually decreases outwardly from the radially inner side thereof.

3. A sealing assembly according to claim 1, in which the band width of the sealing ring is at least 1.5 times the thickness of the inner part thereof.

4. A sealing assembly according to claim 1, which comprises radially extending vent grooves provided on both sides of the ring.

* * * * *